United States Patent
Roh

(10) Patent No.: US 6,954,554 B2
(45) Date of Patent: Oct. 11, 2005

(54) BLOCK CODING/DECODING METHOD AND APPARATUS FOR INCREASING CODE RATE

(75) Inventor: Jae-Woo Roh, Seoul (KR)

(73) Assignee: Daewoo Electronics Corporation (JP)

( * ) Notice: Subject to any disclaimer, the term of this patent is extended or adjusted under 35 U.S.C. 154(b) by 561 days.

(21) Appl. No.: 10/042,398

(22) Filed: Jan. 7, 2002

(65) Prior Publication Data

US 2003/0044075 A1 Mar. 6, 2003

(30) Foreign Application Priority Data

Aug. 30, 2001 (KR) ......................................... 2001-52891

(51) Int. Cl.⁷ ............................................... G06K 9/36
(52) U.S. Cl. ........................ 382/232; 382/233; 382/236
(58) Field of Search ........................... 341/58, 159, 59, 341/155, 158, 67; 380/201; 386/125, 126; 382/232, 233, 236, 243, 248; 711/1, 117, 202; 709/219, 247; 710/5, 68; 348/473

(56) References Cited

U.S. PATENT DOCUMENTS

| 5,144,304 A | * | 9/1992 | McMahon et al. ............ 341/58 |
| 5,984,512 A | * | 11/1999 | Jones et al. ................. 709/219 |
| 6,081,210 A | | 6/2000 | Nikolic et al. ................ 341/59 |
| 6,119,213 A | * | 9/2000 | Robbins ..................... 711/202 |
| 6,141,721 A | * | 10/2000 | Patterson et al. .............. 711/1 |
| 6,217,234 B1 | * | 4/2001 | Dewar et al. ............... 709/247 |
| 6,799,246 B1 | * | 9/2004 | Wise et al. ................. 711/117 |

FOREIGN PATENT DOCUMENTS

| EP | 0286796 | * 10/1988 | ........... H03M/1/36 |
| EP | 0612175 | 8/1994 | ........... H04L/25/14 |
| JP | 408340260 A | * 12/1996 | ........... H03M/13/00 |
| WO | 0055974 | 9/2000 | ............ H03M/5/14 |

OTHER PUBLICATIONS

Krzymien, "Transmission Performance Analysis of a New Class of Line Codes for Optical Fiber Systems", IEEE Transactions on Communications, vol. 37, No. 4, Apr. 1989, pps. 402–404.*

* cited by examiner

*Primary Examiner*—Anh Hong Do
(74) *Attorney, Agent, or Firm*—Anderson Kill & Olick, PC

(57) ABSTRACT

In a coding method, a $(2N-1)^{st}$ original block of m bits is encoded as an A type weighted block of n bits and a $2N^{th}$ original block of m bits is encoded as a B type weighted block of n bits. In a decoding method, if a weighted block of n bits is the A type block, the weighted block of n bits is decoded as the $(2N-1)^{st}$ original block of m bits, and if otherwise, the weighted block of n bits is decoded as the $2N^{th}$ original block of m bits.

6 Claims, 2 Drawing Sheets

BLOCK CODING/DECODING METHOD AND APPARATUS FOR INCREASING CODE RATE

FIELD OF THE INVENTION

The present invention relates to a block coding and decoding method and apparatus; and, more particularly, to a block coding and decoding method and apparatus capable of increasing a code rate.

BACKGROUND OF THE INVENTION

As is well known, demands for optically storing a large amount of data, such as data for a motion picture film, have been increasing. Therefore, various types of volume holographic data storage(VHDS) system incorporating therein a storage medium have been recently developed for realizing high density optical storage capabilities.

In the VHDS system, source data are segmented into blocks of N data bits, which are also called information bits or message bits, each block capable of representing any of $2^N$ distinct messages. An encoder in the VHDS system transforms each N-bit data block into a larger block of (N+K) bits, called code bits or channel symbols. The K bits, which the encoder adds to each data block, are called redundant bits, parity bits or check bits: they carry no new information. The code is referred to as an (N+K, N) code. The ratio of redundant bits to data bits, K/N, within a block is called redundancy of the code and the ratio of data bits to total bits, N/(N+K), is called a code rate. The code rate may be thought of as the portion of a code bit that constitutes information. For example, in a rate ⅓ code, each code bit carries ⅓ bit of information. If, for example, an error control technique employs a code rate ⅓, the bandwidth expansion is 3.

In other words, the encoder transforms a block of N message digits (a message vector) into a longer block of N+K codeword digits (a code vector), constructed from a given alphabet of elements. When the alphabet consists of two elements (0 and 1), the code is a binary code comprised of binary digits (bits). The explanation provided therein will be confined to binary codes, unless otherwise noted.

The N-bit message forms $2^N$ distinct message sequences referred to as N-tuples (sequences of N digits). The (N+K)-bit blocks can form as many as $2^{N+K}$ distinct sequences, referred to as (N+K)-tuples. The encoding procedure assigns to each of the $2^N$ message N-tuples different one of the $2^{N+K}$ (N+K)-tuples. A block code represents a one-to-one assignment, whereby the $2^N$ message N-tuples are uniquely mapped into a new set of $2^N$ codeword (N+K)-tuples; and the mapping can be accomplished via a look-up table.

In the decoding mode, a multiplicity of decoding algorithms have been used in order to increase the code rate while decreasing the bit error rate.

In a threshold decoding algorithm, a threshold, e.g., an average value or a predetermined value such as 0.5, may be used to assign '0' or '1' to a retrieved or transmitted signal disturbed by channel distortion. In a conventional VHDS system, Gaussian distribution characteristics of a laser beam, lens distortions, scattering and diffraction in the system and so on may be appreciated as a channel. The threshold decoding algorithm has a higher code rate, but also has a higher bit error rate, especially, in case of a lower intensity of laser beam.

An improvement in the bit rate error may be realized by using a local threshold decoding algorithm. The local threshold decoding algorithm divides a decoding region into a plurality of local regions and applies a different threshold for each local region so as to determine '0' or '1'. The local threshold decoding algorithm however has a low compatibility because each of the VHDS systems has intrinsic noise patterns different from each other.

Another improvement may be realized by using a binary differential coding/decoding algorithm. The binary differential decoding algorithm takes advantage of a characteristic that a signal for representing '1' is always larger than a signal for representing its nearest '0'. For example, '0' and '1' are replaced with '01' and '10', respectively, during encoding and its reverse algorithm is used to decode a transmitted signal. The binary differential decoding algorithm has a lower bit error rate, but its code rate is also considerably (50%) decreased.

Another improvement may be achieved by employing a balanced block coding/decoding algorithm. In encoding, an input message is divided into a plurality of message P-tuples and each message P-tuple is encoded with a codeword 2Q-tuple having an equal number of bit "0's" and bit "1's", 2Q being larger than P. In decoding, a transmitted signal is divided into a plurality of codeword 2Q-tuples; and Q number of smaller and greater received values for each codeword 2Q-tuple are reconstructed as "0's" and "1's", respectively.

For example, in a 6:8 balanced block coding/decoding algorithm, $2^6(=64)$ 8 bit codewords which have the same number, i.e., 4, of "0" and "1" bits among $2^8(=256)$ 8 bit codewords are selected to encode 64 message 6-tuples. For instance, 64 balanced blocks selected among $_8C_4(=70)$ 8 bit codewords are used to represent 64 original message blocks of 6-tuples.

Also, in an 8:12 balanced block coding/decoding algorithm, $2^8(=256)$ codeword 12-tuples which have the same number, i.e., 6, of "0" and "1" bits among $2^{12}(=4096)$ 12 bit codewords are selected to encode 256 message 8-tuples. For instance, one of 256 codewords selected from $_{12}C_6(=924)$ codeword 12-tuples is used to represent an original block of 8-bit message.

The 6:8 balanced block coding algorithm has a code rate ¾ since the 6:8 balanced block has 2 redundant bits added to 6 data bits. And, the 8:12 balanced block coding algorithm also has a code rate ⅔, since the 8:12 balanced block has 4 redundant bits to 8 data bits. The balanced block coding algorithm has a lower bit error rate and a higher code rate than the binary differential coding algorithm; however, a still higher code rate is required to use a limited channel resource effectively.

SUMMARY OF THE INVENTION

It is, therefore, a primary object of the present invention to provide a block coding/decoding method capable of increasing a code rate while maintaining low bit error rate.

It is, further, another object of the present invention to provide a block coding/decoding apparatus capable of increasing a code rate while maintaining low bit error rate.

In accordance with one aspect of the invention, a preferred embodiment of the present invention provides an encoding method, including steps of:

determining whether an original block of m bits is a $(2N-1)^{st}$ block of m bits, "m" and N being positive integers; and encoding, if the original block of m bits is the $(2N-1)^{st}$ block of m bits, the original block of m bits as an A type weighted block of n bits, and, if otherwise, encoding the original block of m bits as a B type weighted block of n bits, "n" being an odd integer larger than "m".

In accordance with one aspect of the invention, another preferred embodiment of the present invention provides a decoding method, including steps of:

determining whether a weighted block of n bits is an A type block of n bits, "n" being an odd integer; and decoding, if the weighted block of n bits is the A type block of n bits, the A type block of n bits as a $(2N-1)^{st}$ original block of m bits and, if otherwise, decoding the weighted block of n bits as a $2N^{th}$ original block of m bits, N being a positive integer and "m" being a positive integer smaller than "n".

In accordance with another aspect of the invention, still another preferred embodiment of the present invention, provides a coding/decoding apparatus, including:

a first buffer for outputting a digitalized image signal on a basis of an original block of m bits and generating a timing signal for notifying when the original block is outputted, "m" being a positive integer;

a first control part for determining whether the original block of m bits is a $(2N-1)^{st}$ original block of m bits, based on the timing signal, N being a positive integer;

an encoding part for encoding, if the original block of m bits is the $(2N-1)^{st}$ original block of m bits, the original block of m bits as an A type weighted block of n bits and, if otherwise, encoding the original block of m bits as a B type weighted block of n bits, "n" being an odd integer larger than "m";

a storage medium for storing the encoded block of n bits;

a second buffer for outputting the encoded block stored at the storage medium on a basis of n bits and generating a second timing signal for notifying when the encoded block is outputted;

a second control part for determining whether the encoded block of n bits is the A type block of n bits based on the second timing signal; and a decoding part for decoding, if the encoded block of n bits is the A type block of n bits, the encoded block of n bits as the $(2N-1)^{st}$ original block of m bits and if otherwise, decoding the weighted block of n bits as the $2N^{th}$ original block of m bits.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
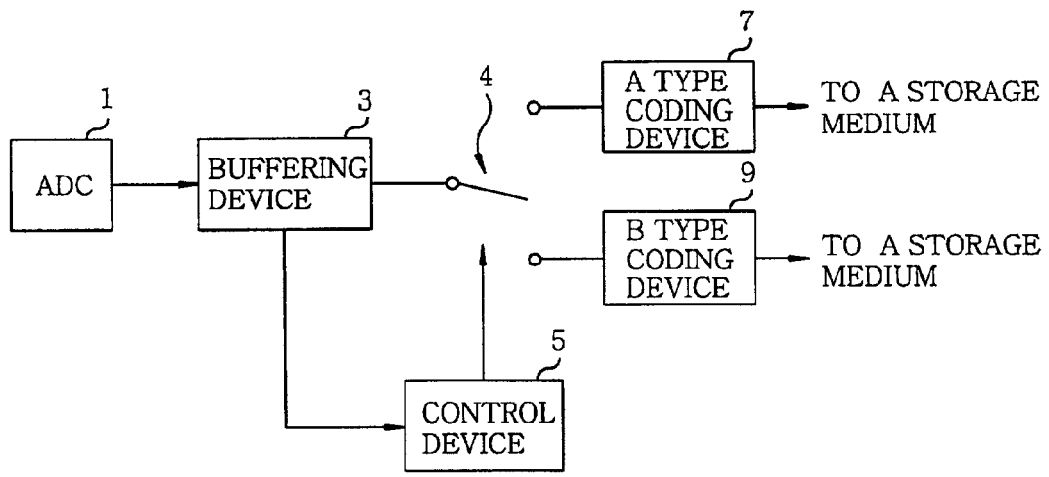
FIG. 1 represents a block diagram for illustrating a balanced block encoding system in accordance with the present invention.

A block coding algorithm in accordance with the present invention uses two weighted blocks of n bits, to thereby obtain a balanced coding block.

For example, in a 5:7 block coding algorithm, an original block of 5 bits is encoded as a weighted block of 7 bits. The weighted block of 7 bits is either an A type weighted block having three bits of "1" and four bits of "0", or a B type weighed block having four bits of "1" and three bits of "0". Since 7 bits in the weighted block can express $_7C_4(=35)$ or $_7C_3(=35)$ codewords (a method for calculating the number of possible codewords will be described later on) and 5 bits in the original block can express $2^5(=32)$ messages, 32 codewords may be selected among 35 codewords to sufficiently represent 32 messages. However, since the bit number of "1" cannot be equal to that of "0" in each weighted block of 7-bit codeword, each weighted block cannot form a balanced coding block.

To solve the problem, the present invention uses the A type weighted block of 7-bit codeword to represent a $(2N-1)^{st}$ original block of 5-bit message, and uses the B type weighted block of 7-bit codeword to represent a $2N^{th}$ original block of 5-bit message, wherein N is a positive integer. Both A type weighted block and its corresponding B type weighted block are combined to form a balanced coding block in which the bit number of "1" is equal to that of "0". On the contrary, it will become apparent to those skilled in the art that the A type weighted block can be used to represent the $2N^{th}$ original block and the B type weighted block can be used to represent the $(2N-1)^{st}$ original block.

Meanwhile, a 5:7 block decoding algorithm is performed in a reverse process as described above. In the 5:7 block coding algorithm, it has been assumed that the $(2N-1)^{st}$ original block of 5-bit message has been encoded as the A type weighted block of 7-bit codeword having three bits of "1" and four bits of "0", and the $2N^{th}$ original block of 5-bit message has been encoded as the B type weighted block of 7-bit codeword having four bits of "1" and three bits of "0". If a coded block has three bits of "1" and four bits of "0" in the 5:7 block decoding algorithm, the coded block of 7 bits is determined as an A type weighted block of 7-bit codeword. Since the A type weighted block of 7-bit codeword represents the $(2N-1)^{st}$ original block of 5-bit message, the coded block of 7 bits is decoded as the $(2N-1)^{st}$ original block of 5-bit message. Similarly, if a coded block has four bits of "1" and three bits of "0" in the 5:7 block decoding algorithm, the coded block of 7 bits can be decoded as the $2N^{th}$ original block of 5-bit message.

In the 5:7 block coding and decoding algorithm, each weighted block of 7-bit codeword is composed of three or four bits of "1", and four or three bits of "0". In other words, there exists only a single selectable combination of 3 and 4 in the 5:7 block coding and decoding algorithm.

However, the present invention can be also applied to a case having a plurality of selectable combinations. For example, in the 8:11 block coding and decoding algorithm, there are two selectable combinations for encoding an original block of 8-bit message as a weighted block of 11-bit codeword.

A first selectable combination in the 8:11 block coding algorithm is consisted of 4 and 7. If an A type weighted block of 11 bits has four bits of "1" and seven bits of "0" (or seven bits of "1" and four bits of "0"), each weighted block of 11 bits may be expressed as one of $_{11}C_4(=330)$ codewords. The original block of 8 bits is expressed as one of $2^8(=256)$ 8-bit messages. Therefore, only 256 codewords may be selected among 330 codewords to sufficiently represent 256 8-bit messages.

In accordance with the present invention, a $(2N-1)^{st}$ original block of 8-bit message and a $2N^{th}$ original block of 8-bit message are encoded as the A type weighted block of 11-bit codeword and the B type weighted block of 11-bit codeword, respectively. Therefore, the A type weighted block and the B type weighted block are combined to form a balanced coding block in which the bit number of "1" is equal to that of "0".

The corresponding decoding algorithm for the 8:11 block coding algorithm having the first combination is also performed in a reverse process as described above, similarly with a case of the single combination.

Herein, it is assumed that the $(2N-1)^{st}$ original block of 8-bit message has been encoded as the A type weighted block of 11-bit codeword having four bits of "1" and seven bits of "0", and the $2N^{th}$ original block of 8-bit message has been encoded as the B type weighted block of 11-bit codeword having seven bits of "1" and four bits of "0". If a coded block has four bits of "1" and seven bits of "0" in the 8:11 block decoding algorithm, the coded block of 11 bits is an A type weighted block of 11-bit codeword. Since the A type weighted block of 11-bit codeword represents the $(2N-1)^{st}$ original block of 8-bit message, the coded block of 11 bits is decoded as the $(2N-1)^{st}$ original block of 8-bit message. Similarly, if a coded block has seven bits of "1" and four bits of "0" in the 8:11 block decoding algorithm, the coded block of 11 bits can be decoded as the $2N^{th}$ original block of 8-bit message.

In the meantime, a second selectable combination in the 8:11 block coding algorithm is consisted of 5 and 6. If an A type weighted block of 11 bits has five bits of "1" and six bits of "0" (or six bits of "1" and five bits of "0"), the weighted block of 11 bits is expressed as one of $_{11}C_5(=462)$ codewords. Therefore, 256 codewords may be selected among 462 codewords to sufficiently represent 256 messages. A $(2N-1)^{st}$ original block of 8-bit message and a $2N^{th}$ original block of 8-bit message are encoded as the A type weighted block of 11-bit codeword and the B type weighted block of 11-bit codeword, respectively. Therefore, the A type weighted block and the B type weighted block are combined to form a balanced coding block in which the bit number of "1" is equal to that of "0".

The corresponding decoding algorithm for the 8:11 block coding algorithm having the second combination is also performed in a reverse process as described above, similarly with cases of the single combination and the first combination.

Herein, it is assumed that the $(2N-1)^{st}$ original block of 8-bit message has been encoded as the A type weighted block of 11-bit codeword having five bits of "1" and six bits of "0", and the $2N^{th}$ original block of 8-bit message has been encoded as the B type weighted block of 11-bit codeword having six bits of "1" and five bits of "0". If a coded block has five bits of "1" and six bits of "0" in the 8:11 block decoding algorithm, the coded block of 11 bits is an A type weighted block of 11-bit codeword. Since the A type weighted block of 11-bit codeword represents the $(2N-1)^{st}$ original block of 8-bit message, the coded block of 11 bits is decoded as the $(2N-1)^{st}$ original block of 8-bit message. Similarly, if a coded block has six bits of "1" and five bits of "0" in the 8:11 block decoding algorithm, the coded block of 11 bits can be decoded as the $2N^{th}$ original block of 8-bit message.

Accordingly, an original block of m-bit message may be encoded as a weighted block of n-bit codeword in accordance with the present invention. However, in order to perform the block coding and decoding algorithm in accordance with the present invention, the number of the possible codewords should be determined. Herein, the number of the possible codewords is determined based on the selectable combinations. The selectable combinations may be obtained according to the bit number of "1" or "0" in the weighted block of n bits.

In an m:n block coding algorithm, the bit number "a" of "1" in the weighted block of n bits can be calculated as follows:

$$2^m <\ _nC_a \qquad (1)$$

wherein "n" is an odd integer larger than "m" and "a", and "m" and "a" are positive integers, respectively.

For example, in the 8:11 block coding algorithm, "a" should be satisfied with $256 <\ _{11}C_a$ so that "a" is a positive integer between 4 and 7.

Since "a" is related to the bit number of "1" in one of two weighted blocks, the bit number "t" of "1" in the other weighted block can be calculated as follows:

$$t = n - a \qquad (2)$$

Hereinafter, a preferred embodiment of the present invention will be explained.

FIG. 1 represents a block diagram for illustrating a block coding system in accordance with the present invention. The block coding system includes an analog-to-digital converter (ADC) 1, a buffering device 3, a switch 4, a control device 5, an A type coding device 7 and a B type coding device 9.

The ADC 1 digitizes an input image signal and provides a digitized image signal to the buffering device 3. The buffering device 3 outputs the digitized image signal on a basis of an original block of m-bit message, "m" being a positive integer, and generates a first or a second timing signal for notifying when the original block is outputted. The first timing signal notifies when a $(2N-1)^{st}$ original block is outputted from the buffering device 3 and the second timing signal notifies when a $2N^{th}$ original block is outputted from the buffering device 3, N being a positive integer.

The control device 5 controls the switch 4, based on the timing signals generated from the buffering device 3 so that the original block may be transmitted from the buffering device 3 to the A type coding device 7 and/or the B type coding device 9. If receiving the first timing signal from the buffering device 3, the control device 5 controls the switch 4 to be connected with the A type coding device 7. In the meantime, if receiving the second timing signal from the buffering device 3, the control device 5 controls the switch 4 to be connected with the B type coding device 9.

The A type coding device 7 encodes the $(2N-1)^{st}$ original block of m-bit message transmitted from the buffering device 3 via the switch 4 as an A type weighted block of n bits, wherein "n" is an odd integer larger than "m".

The B type coding device 9 encodes the $2N^{th}$ original block of m-bit message transmitted from the buffering device 3 via the switch 4 as a B type weighted block of n bits.

Figure 2:
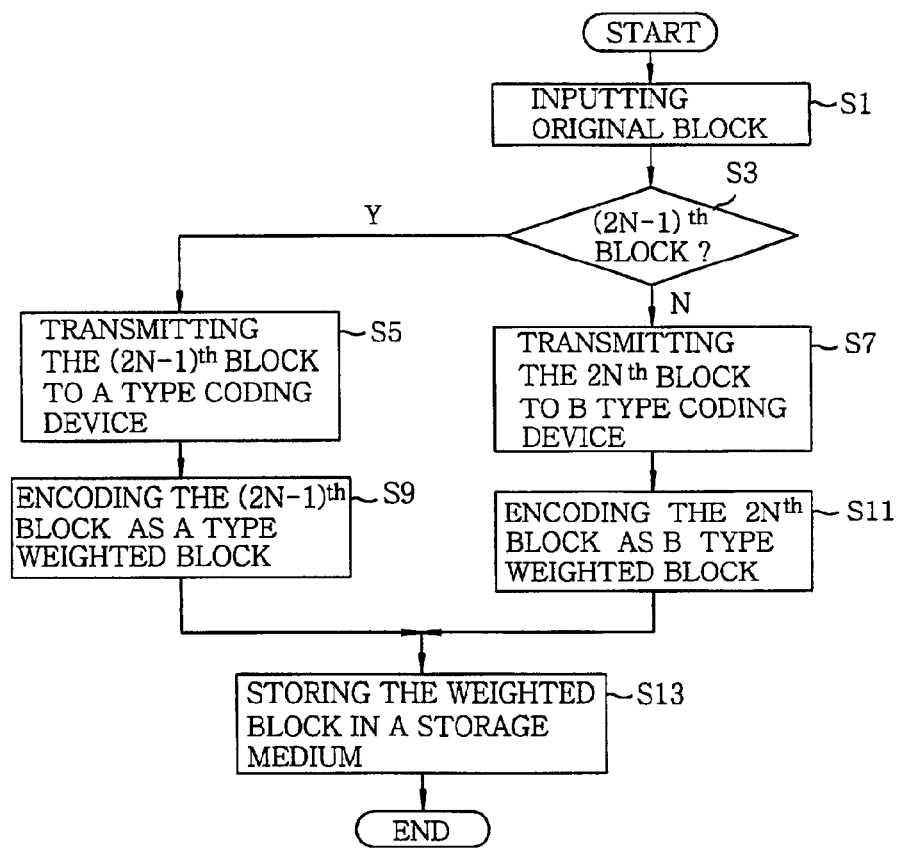
FIG. 2 shows a flow chart for illustrating an encoding algorithm in accordance with the present invention.

FIG. 2 shows a flow chart for illustrating a block coding algorithm in accordance with the present invention. The block coding algorithm will be explained with reference to FIG. 1.

At step S1, an original block of m-bit message is inputted into the buffering device 3.

At step S3, the control device 5 determines whether the inputted original block is the (2N−1)st original block, based on the timing signals generated from the buffering device 3. If the control device 5 receives the first timing signal from the buffering device 3, the inputted original bock is decided to be the $(2N-1)^{st}$ original block and, then, the subsequent process goes to step S5. If the control device 5 receives the second timing signal from the buffering device 3, the inputted original block is decided to be the $2N^{th}$ original block and the subsequent process goes to step S7. At step S5, the $(2N-1)^{st}$ original block is transmitted to the A type coding device 7 and, at step S7, it is encoded as an A type weighted block.

At step S7, the $2N^{th}$ original block is transmitted to the B type coding device 9 and, at step 51, it is encoded as a B type weighted block.

At step S13, each weighted block is stored in a storage medium, e.g., a magnetic record medium, a holographic data storage medium and so on.

Figure 3:
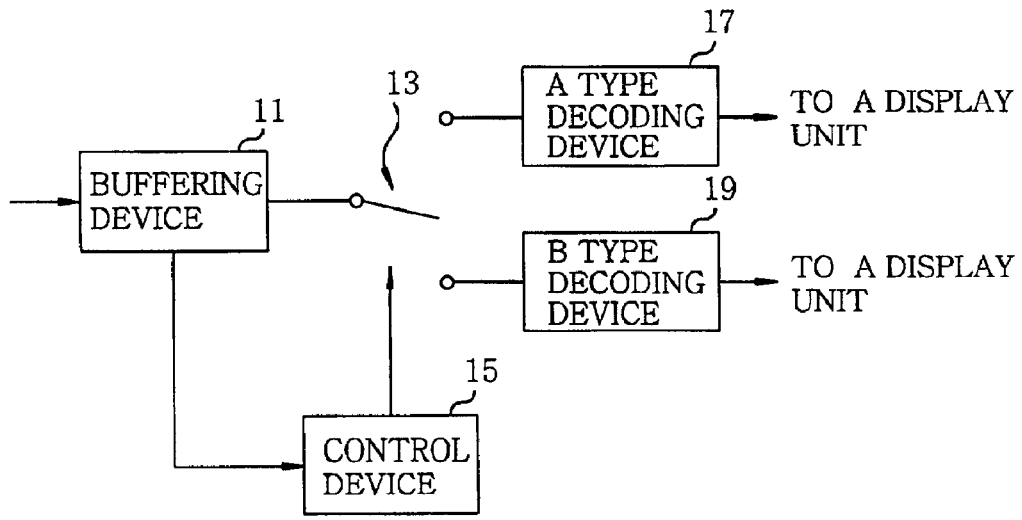
FIG. 3 describes a block diagram for illustrating a balanced block decoding system in accordance with the present invention.

FIG. 3 describes a block diagram for illustrating a block decoding system in accordance with the present invention. The block decoding system includes a buffering device 11, a switch 13, a control device 15, an A type decoding device 17 and a B type decoding device 19.

The buffering device 11 outputs a weighted block delivered from the storage medium on a basis of n bits. Also, the buffering device 11 generates a third or a fourth timing signal for notifying when the weighted block is outputted. The third timing signal notifies when an A type weighted block is outputted from the buffering device 11 and the fourth timing signal notifies when a B type weighted block is outputted from the buffering device 11.

The control device 15 controls the switch 13, based on the timing signals received from the buffering device 11 so that the weighted block may be transmitted from the buffering device 11 to the A type decoding device 17 and/or the B type decoding device 19. Receiving the third timing signal from the buffering device 11, the control device 15 controls the switch 13 to be connected with the A type decoding device 17. In the meantime, receiving the fourth timing signal from the buffering device 11, the control device 15 controls the switch 13 to be connected with the B type decoding device 19.

The A type decoding device 17 decodes the A type weighed block of n bits transmitted from the buffering device 11 via the switch 13 as a $(2N-1)^{st}$ original block of m bits. The B type decoding device 19 decodes the B type weighed block of n bits transmitted from the buffering device 11 via the switch 13 as a $2N^{th}$ original block signal of m bits. The decoded original blocks are transmitted to a display unit.

Figure 4:
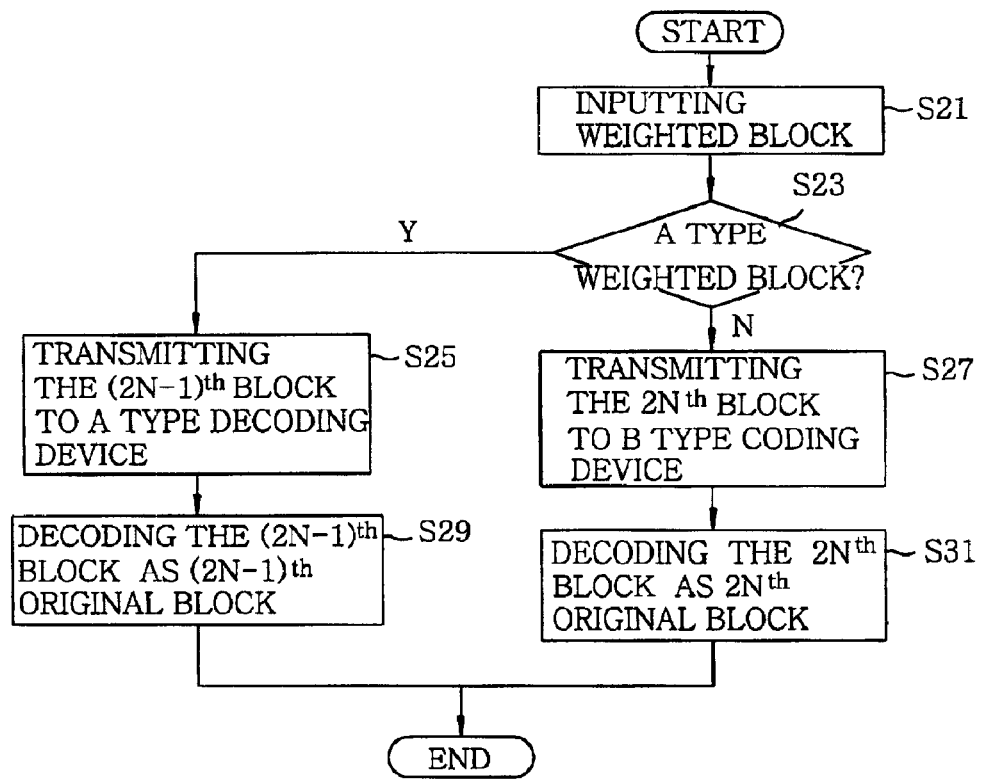
FIG. 4 provides a flow chart for illustrating a decoding algorithm in accordance with the present invention.

FIG. 4 provides a flow chart for illustrating a decoding algorithm in accordance with the present invention. The block decoding algorithm will be explained with reference to FIG. 3.

At step S21, a weighted block of n bits is inputted into the buffering device 11.

At step S23, the control device 15 determines whether the inputted weighted block is an A type weighted block, based on the timing signals from the buffering device 11. If the control device 15 receives the third timing signal from the buffering device 11, the inputted weighted block is decided to be the A type weighted block and the subsequent process goes to step S25. If the control device 15 receives the fourth timing signal from the buffering device 11, the inputted weighted block is decided to be the B type weighted block and the subsequent process goes to step S27.

At step S25, the A type weighted block is transmitted to the A type decoding device 17 and, at step S29, it is decoded as a $(2N-1)^{st}$ original block.

At step S27, the B type weighted block is transmitted to the B type decoding device 19 and, at step S31, it is decoded as a $2N^{th}$ original block.

The $(2N-1)^{st}$ and the $2N^{th}$ original block are transmitted to the display unit, so that the decoding algorithm may be terminated.

While the invention has been shown and described with respect to the preferred embodiments, it will be understood by those skilled in the art that various changes and modifications may be made without departing from the spirit and scope of the invention as defined in the following claims.

What is claimed is:

1. A block encoding method, comprising steps of: determining whether an original block of m bits is a $(2N-1)^{st}$ block of m bits, "m" and N being positive integers; and encoding, if the original block of m bits is the $(2N-1)^{st}$ block of m bits, the original block of m bits as an A type weighted block of n bits having a preselected number of "1" bits and "0" bits and, if otherwise, encoding the original block of m bits as a B type weighted block of n bits 7 having another pre-selected number of "1" bits and "0" bits where "n" being an odd integer larger than "m", wherein both A type weighted block and its corresponding B type weighted block are combined to form a balance coding block in which the bit number of "1" is equal to that of "0".

2. The method of claim 1, wherein the bit number "a" of bit "1" in the A type weighted block of n bits satisfies a relation $2^m < {}_nC_a$, "a" being a positive integer, and the bit number of "1" in the B type weighted block of n bits is given by "n−a".

3. A block decoding method, comprising steps of: determining whether a weighted block of n bits is an A type weighted block of n bits having a preselected number of "1" bits and "0" bits, or a B type weighted block of n bits, having another preselected number of "1" bits and "0" bits, where "n" being an odd integer; and decoding, if the weighted block of n bits is the A type weighted block of n bits, the A type weighted block of n bits as a $(2N-1)^{st}$ original block of m bits and, if otherwise, decoding the B type weighted block of n bits as a $2N^{th}$ original block of m bits, N being a positive integer and "m" being a positive integer smaller than "n", wherein both A type weighted block and its corresponding B type weighted block are combined to form a balance coding block in which the bit number of "1" is equal to that of "0".

4. The method of claim 5, wherein the bit number "a" of "1" in the A type weighted block of n bits satisfies a relation $2^m < {}_nC_a$.

5. A coding/decoding apparatus, comprising: a first buffer for outputting a digitalized image signal on a basis of an original block of in bits and generating a timing signal for notifying when the original block is outputted, "m" being a positive integer; a first control part for determining whether the original block of m bits is a $(2N-1)^{st}$ original block of m bits, based on the timing signal, N being a positive integer; an encoding part for encoding, if the original block of in bits is the $(2N-1)^{st}$ original block of m bits, the original block of m bits as an A type weighted block of n bits having a preselected number of "1" bits and "0" bits, or a B type weighted block of n bits and, if otherwise, encoding the original block of m bits as a B type weighted block of n bits having another preselected number of "1" bits and "0" bits, where "n" being an odd integer larger than "m", wherein both A type weighted block and its corresponding B type weighted block are combined to form a balance coding block in which the bit number of "1" is equal to that of "0"; a storage medium for storing the encoded block of n bits; a second buffer for outputting the encoded block stored at the storage medium on a basis of n bits and generating a second timing signal for notifying when the encoded block is outputted; a second control part for determining whether the encoded block of n bits is the A type block of n bits based on the second timing signal; and a decoding part for decoding, if the encoded block of n bits is the A type block of n bits, the encoded block of n bits as the $(2N-1)^{st}$ original block of m bits and if otherwise, decoding the weighted block of n bits as the $2N^{th}$ original block of m bits.

6. The apparatus of claim 5, wherein the bit number "a" of bit "1" in the A type weighted block of n bits satisfies a relation $2^m <\ _nC_a$, "a" being a positive integer, and the bit number of "1" in the B type weighted block of n bits is given by "n−a".

* * * * *